(12) United States Patent
Mao

(10) Patent No.: US 6,495,818 B1
(45) Date of Patent: *Dec. 17, 2002

(54) MICROSCOPIC HYPERSPECTRAL IMAGING SCANNER

(75) Inventor: Chengye Mao, Slidell, LA (US)

(73) Assignee: The Institute for Technology Development, Jackson, MI (US)

( * ) Notice: Subject to any disclaimer, the term of this patent is extended or adjusted under 35 U.S.C. 154(b) by 87 days.

This patent is subject to a terminal disclaimer.

(21) Appl. No.: 09/664,536

(22) Filed: Sep. 18, 2000

Related U.S. Application Data

(63) Continuation-in-part of application No. 09/120,092, filed on Jul. 21, 1998, now Pat. No. 6,166,373.

(51) Int. Cl.$^7$ .................................................. H01J 3/14
(52) U.S. Cl. ........................ 250/226; 250/234; 356/310
(58) Field of Search ............................ 250/226, 280.1, 250/234; 356/310

(56) References Cited

U.S. PATENT DOCUMENTS 6,166,373 A * 12/2000 Mao ........................... 250/226
6,337,472 B1 * 1/2002 Garner et al. ............. 250/201.3

FOREIGN PATENT DOCUMENTS

DE 3402952 A1 * 8/1985 ........... G02B/21/24
JP 11271854 * 10/1999

* cited by examiner

Primary Examiner—Stephone Allen
Assistant Examiner—Bradford Hill
(74) Attorney, Agent, or Firm—Crowell & Moring LLP

(57) ABSTRACT

A microscopic hyperspectral imaging scanner has a microscopic front objective lens, a spatial window for selectively passing a portion of the image therethrough, and a CCD array for receiving the passed portion of the image. The spatial window and CCD array are mounted for tandem reciprocating movement relative to the front object lens. In one embodiment, the spatial window is a slit and the CCD array is one-dimensional, and successive rows of the image in the focal plane of the front objective lens are passed to the CCD array by an image relay lens interposed between the slit and the CCD array. In another embodiment, the spatial window is a slit, the CCD array is two-dimensional, and a prism-grating-prism optical spectrometer is interposed between the slit and the CCD array so as to cause the scanned row to be split into a plurality of spectral separations onto the CCD array. In another embodiment, the CCD array is two-dimensional and the spatial window is a rectangular linear variable filter ("LVF") window, so as to cause the scanned rows impinging on the LVF to be bandpass filtered into spectral components onto the CCD array through an image relay lens interposed between the LVF and the CCD array.

30 Claims, 8 Drawing Sheets

SLIT MOVEMENT
IN FOCAL PLANE

LINEAR VARIABLE FILTER

LVF SPECTRAL PERFORMANCE

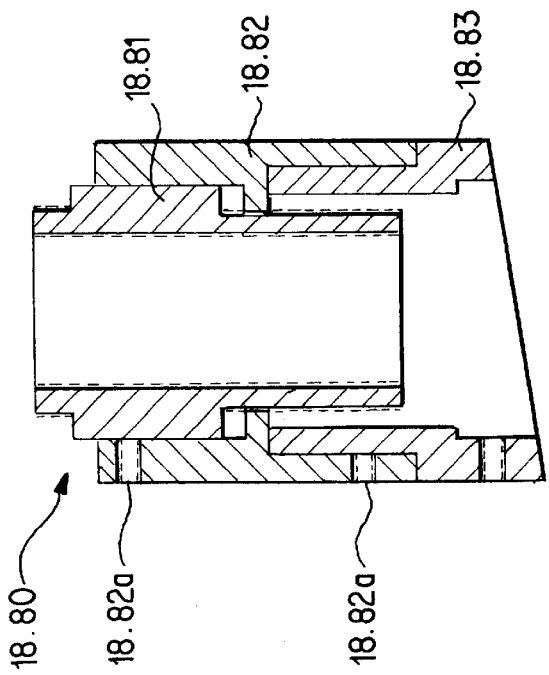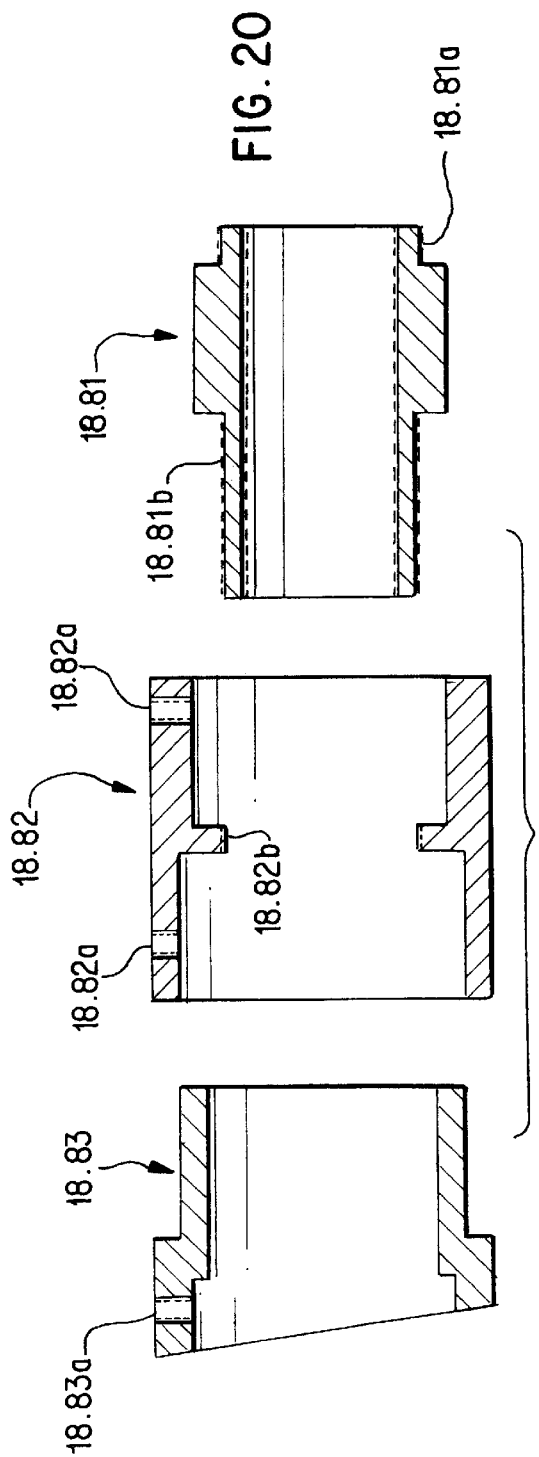

MICROSCOPIC HYPERSPECTRAL IMAGING SCANNER

This application is a continuation in part of U.S. patent application Ser. No. 09/120,092 filed Jul. 21, 1998, now U.S. Pat. No. 6,166,373.

BACKGROUND AND SUMMARY OF THE INVENTION

The present invention relates, in general, to image scanning, and in particular, to a microscopic scanner for generating an electronic version of a scanned optical image.

It is often desired to scan an image of a target and then convert that image into an electrical signal for subsequent processing and viewing. Airborne scanners are well-known in which a slit is placed in front of a charge-coupled device ("CCD") array in a camera and the moving aircraft then sweeps (scans) the slit past the target to be scanned as the aircraft flies over the ground. Such scanners have the disadvantage that the airborne scanner platform must move with respect to the target in order to accomplish the scanning.

Other image scanning devices, such as flatbed scanners or drum scanners, are known in which the target is moved past a scanning head so that the image can pass through optics and into a camera and/or onto a CCD array. Such a scanner is disclosed for example in U.S. Pat. Nos. 5,751,420; 5,706,083; and 5,592,291.

In all such prior art devices, the target moves relative to the scanner for each scanned image line, the CCD array remains fixed (non-moving) with respect to the front objective lens of the scanner.

It is also desirable to be able to obtain a spectral representation or imaging spectrograph of the frequency components of an image so that the spectral representation may be further processed to reveal information hidden in the frequency components of the image. For example, in the paper entitled "Airborne Hyperspectral Image Acquisition with Digital CCD Video Camera", Chengye Mao, Mike Seal, and Gerald Heitschmidt describe an airborne scanning system in which a linear variable filter ("LVF") is placed at the focal plane of a front objective lens, and, as an aircraft transports the scanner over the ground-based target, the linear variable filter separates frequency components of the image that passes by the front objective lens onto a CCD array within a camera. Unlike the present invention, the linear variable filter and CCD array are fixed with respect to the front objective lens, and the scanner must reside on a mobile platform and move past the target in order to accomplish the scanning of the image.

Furthermore, it is desirable to combine the features of a spectrographic instrument or hyperspectral scanner such as described above in a scanning microscope, so that spectral analysis of surface and potentially subsurface features of a sample may be carried out on a microscopic scale. Microscopic hyperspectral scanning of prepared specimens, for example body tissue and fluids and other targets, has great utility in the field of medicine and in the analysis of the physical and mechanical properties of materials. It can also be used to detect the chemical properties of microscopic samples.

An example of a spectral microscopic photometer is disclosed for example in U.S. Pat. No. 5,112,125, in which light from an illuminated sample is collected and measured by means of a series of lenses, diaphragms and photodetectors. Similarly, U.S. Pat. No. 4,631,581 discloses an apparatus for microphotometering of microscopic specimens, which uses both mechanical and electronic scanning techniques to generate a three dimensional image of a target specimen.

As noted previously, however, a disadvantage of each of these devices is that in order to scan the entire surface of the specimen, it is necessary to move the sample relative to the scanning instrument for each scanned image line. For example, in U.S. Pat. No. 5,112,125 a scanning stage which supports the specimen is adjustable along through orthogonal axes, so that it can also be used to carry out time-resolved spectral measurements. Similarly in U.S. Pat. No. 4,631,581, a drive unit is provided to move the sample in order to scan elongated samples.

Scanning becomes extremely difficult to control when a translation of a sub-micrometer level is required for scanning an image line of the specimen under a microscope with high magnification. That is, due to the high magnification of the microscope, all movements of the specimen are enlarged correspondingly and their apparent velocity is multiplied, making positioning of the specimen difficult to control. Also, due to continuous movement of the specimen, any contemporaneous viewing of the specimen through the microscopic eye piece become problematic as well.

It is therefore an object of the present invention to provide an improved image scanner that has a unique feature: instead of directly scanning over the target, it scans a target at its image's focal plane. Such a scanner is able to perform a uniformed scanning regardless of the target size. For example, the scanning distance will be the same when scanning targets as large as the Earth disk from a geostationary satellite or as small as a tiny germ under a microscope.

The present invention is a focal plane scanner having a front objective lens, a spatial window for selectively passing a portion of the image therethrough, and image sampling array means, such as a charge coupled device ("CCD") array, for receiving the passed portion of the image. In particular in the microscopic hyperspectral scanner according to the invention, the front objective lens is a microscopic objective lens.

An essential feature common to all embodiments of the invention is that the spatial window and CCD array are mounted for simultaneous relative reciprocating movement with respect to the front objective lens, with the spatial window being mounted within the focal plane of the front objective lens.

In a first embodiment of the present invention, the spatial window is a slit and the CCD array is one-dimensional. As the slit moves within the focal plane of the front objective lens, successive rows of the image in the focal plane of the front objective lens are passed to the CCD array by an image relay lens interposed between the slit and the CCD array.

In a second embodiment of the present invention, the spatial window is a slit, the CCD array is two-dimensional, and a prism-grating-prism ("PGP") optical spectrometer is interposed between the slit and the CCD array so as to cause the scanned row to be split into a plurality of spectral separations onto the CCD array, with spectral components for each point in the scanned row being separated onto the respective CCD columns for that point.

In a third embodiment of the present invention, the CCD array is two-dimensional and the spatial window is a rectangular linear variable filter ("LVF") window, so as to cause the scanned rows impinging on the LVF to be bandpass filtered into spectral components onto the CCD array through an image relay lens interposed between the LVF and the CCD array.

In a fourth embodiment of the invention, a microscopic objective lens is provided to generate a magnified image of a target specimen which is projected onto the slit, so that rows which make up the image are projected sequentially onto the CCD array as the spatial window and the CCD array are moved in tandem relative to the microscopic objective lens in order to scan an enlarged image of the entire specimen.

Other objects, advantages and novel features of the present invention will become apparent from the following detailed description of the invention when considered in conjunction with the accompanying drawings.

BRIEF DESCRIPTION OF THE DRAWINGS

FIG. 19 shows the constructional details of a microscope adapter assembly in the embodiment of FIG. 18; and FIG. 20 shows the separated components of the microscope adapter assembly of FIG. 19.

DETAILED DESCRIPTION OF THE DRAWINGS

Figure 1:
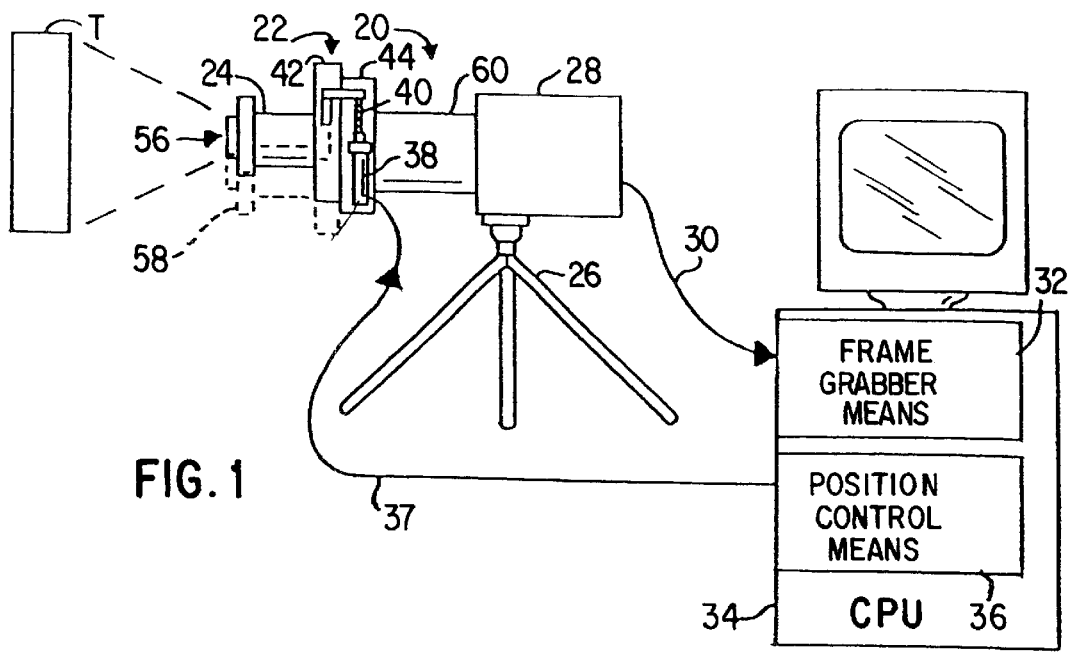
FIG. 1 is a schematic view showing the general structure of all embodiments of the present invention.

Referring to FIG. 1, all embodiments of the focal plane scanner 20 of the present invention are seen to comprise a translation stage mounting means 22 for mounting a spatial window, hereinafter described, for reciprocating movement within the focal plane of a well known first optical objective lens means 24, so that the spatial window moves relative to the first objective lens means 24 and within the focal plan. First optical objective lens means 24 preferably is a model Cinegon 1.4/8 mm lens assembly part number 21-023340, having characteristics of near infrared rectification and made by Schneider Optics, Inc., having an address of 285 Oser Ave., Hauppauge, N.Y. 11788.

The focal plane scanner 20 may be mounted as on a tripod 26 in the proximity of a target T, and a scanned image of target T is viewed by a well-known CCD camera means 28 that translates the image into electrical signals and then transmits the scanned image along an electrical video cable 30 to a well-known "Frame grabber" means 32 within a well-known computer 34, which then stores the scanned and captured image into a memory or onto a disk for subsequent viewing and further processing. Frame grabber means 32 preferably is a model SensiCam PCI Interface Board computer interface made by The Cooke Corporation, Ltd., having an address of 600 Main Street, P.O. Box 888, Tanawanda, N.Y. 14150-0888, and receives the electrical video signals from CCD camera means 28 and then stores the received signals into a memory for access by computer 34.

Computer 34 also controls, using a well-known interface logic board 36 operating over an electrical cable 37, a well known servo motor 38 mounted to translation stage mounting means 22 so that, as the shaft 40 of servo motor 38 is caused to turn under the direction and control of interface logic board 36, the front portion 42 of translation stage mounting means 22 is caused to reciprocatingly move relative to the rear portion 44 of translation stage mounting means 22. The position control afforded by interface logic board 36 is preferably provided by a well known interface logic board such as the model MM2000-OPT/01-08 850f computer interface made by Newport Corporation, having an address of 1791 Deere Avenue, Irvine, Calif. 92606.

Figure 12:
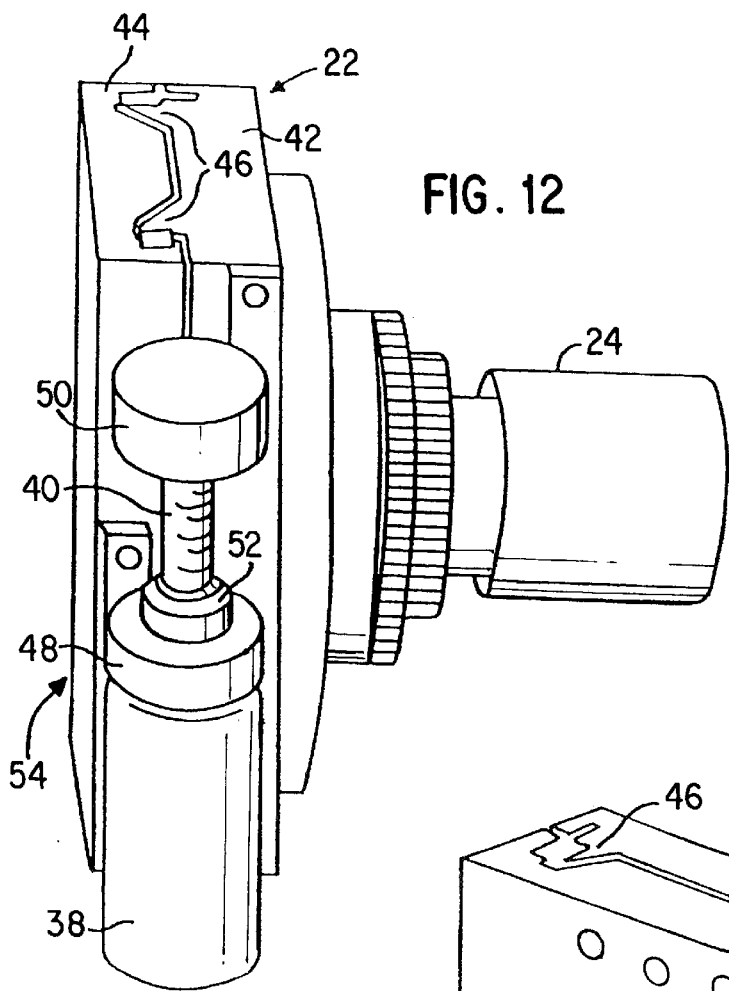
FIG. 12 is a side perspective view of the translation stage mounting means for all embodiments that provides reciprocating relative movement, within the focal plane of the image, of the spatial window with respect to the first objective lens.
Figure 13:
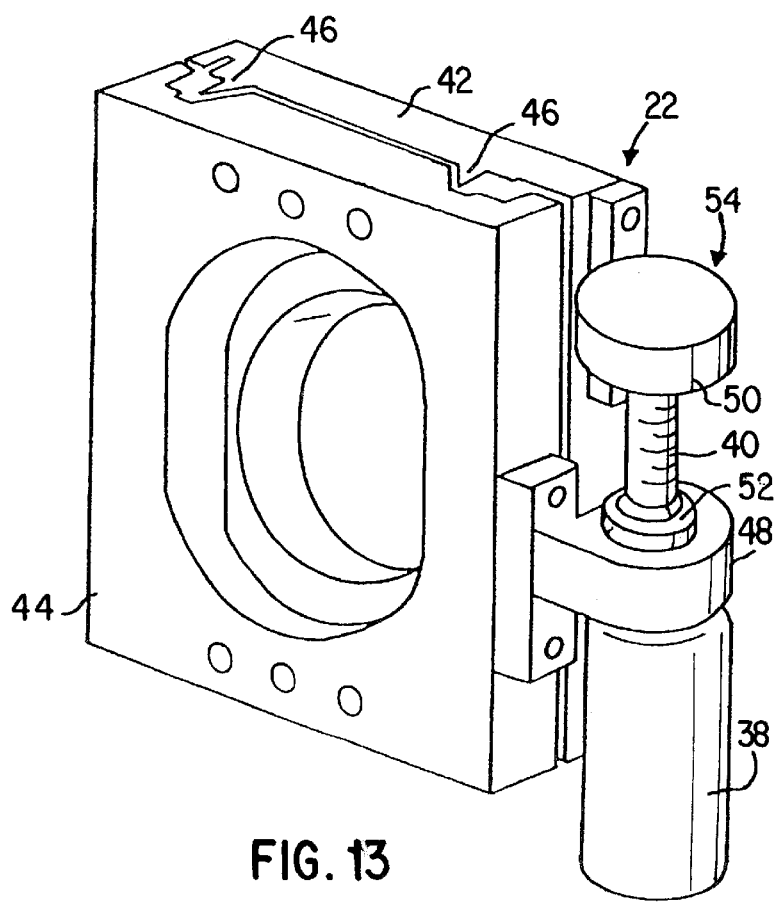
FIG. 13 is a rear perspective view of the translation stage mounting means for all embodiments that provides reciprocating relative movement, within the focal plane of the image, of the spatial window with respect to the first objective lens.
Figure 14:
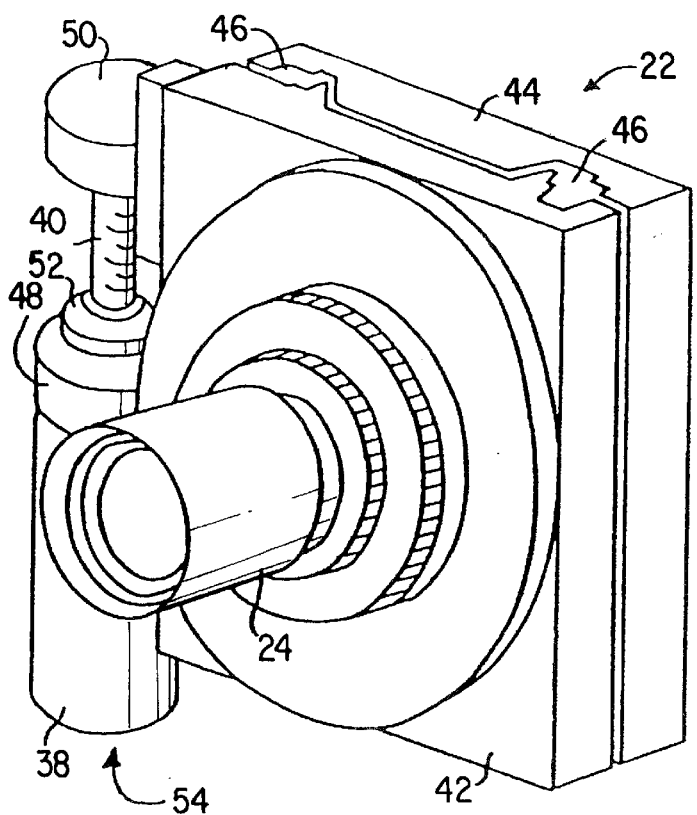
FIG. 14 is a front perspective view of the translation stage mounting means for all embodiments that provides reciprocating relative movement, within the focal plane of the image, of the spatial movement with respect to the first objective lens.

Referring additional to FIGS. 12–14, the operation of translation stage mounting means 22 can now be explained.

Translation stage mounting means 22 has a front portion 42 and a rear portion 44 mounted, as on well-known rails or guides 46, for sliding linear reciprocation of front portion 42 with respect to rear portion 44. First objective lens means 24 is fixedly secured, as by screws or the like, to the front portion 42 of translation stage mounting means 22. Servo motor 38, preferably a well-known servo motor such as the model 850F DC Actuator servo motor made by Newport Corporation, having an address of 1791 Deere Avenue, Irvine, Calif. 92606, is fixedly mounted to one of front or rear portions 42, 44, as by bracket 48, and the end of servo motor shaft 40 is secured to the other of front or rear portions 42, 44, as by bracket 50, for axial rotation and prevented from longitudinal movement with respect thereto. As threaded shaft 40 of servo motor 38 rotates within a threaded bushing 52 of servo motor 38, shaft 40 is thereby caused to extend or retract, depending on the direction of rotation, with respect to servo motor 38, thereby causing front and rear portions 42 and 44 to slidingly reciprocate with respect to each other under the control of interface logic board 36, which thus acts as position control means for the reciprocating movement of translation stage mounting means 22.

As hereinafter described, fixedly mounted to the rear portion 44 of translation stage mounting means 22 and within the focal plane of first objective lens means 24 is one of a variety of spatial window means, hereinafter described, for selectively passing one portion of the image in the focal plane.

Servo motor 38, thus mounted and structurally connected to translation stage mounting means 22 in the manner hereinbefore described, is seen to be motion means 54 for causing the reciprocation of rear portion 44 of translation stage mounting means 22 relative to first objective lens means 24. Because of the fixed mounting of the spatial window means within the focal plane of the first objective lens means 24, motion means 54 is thus seen to be for moving the spatial window means within the focal plane of the first objective lens means 24 and relative to the first objective lens means 24 as front objective means 24 and front portion 42 of translation stage mounting means 22 move relative to rear portion 44 of translation stage mounting means 22, such as for example, from position 56 shown in solid outline in FIG. 1 to position 58 shown in dotted outline in FIG. 1.

Using a preferred servo motor 38 as hereinbefore described and having a shaft reciprocation speed of about 1 mm per second, the translation stage mounting means 22 takes about 13 seconds to traverse one stroke direction of reciprocation.

Focal plane scanner 20 is preferably mounted on a tripod 26 in proximity to a target T as shown in FIG. 1. If the translation stage mounting means 22 is mounted so that first object lens 24 is fixed, the scanned image will have certain mathematical advantages because the first objective lens is stationary with respect to target, and the image will be a so-called "center projection image". If the translation stage mounting means 22 is mounted so that its rear portion 44 remains fixed, then front objective lens 24 will move slightly with respect to the target T and transversely to the optical path, and the image will be a so-called "multi-center projection image". As a practical matter, the very slight change in the image (and its mathematical description) that occurs, when the front objective lens 24 reciprocates upon the translation stage mounting means 22, is negligible, except in the case of targets that are immediately adjacent the front object lens as in the microscopic embodiment described later.

In non-microscopic embodiments, therefore, it has been found preferable to fixedly mount the rear portion 44 of translation stage mounting means 22 and allow the front objective lens 24 to move slightly relative to the target T because of the substantially greater weight and inertia of the CCD camera 28 and image relay/filter suite 60, hereinafter described, attached to the rear of the translation stage mounting means 22, as compared with the weight and inertia of the front objective lens 24, thereby requiring less torque from servo motor 38 to move the lesser weight and inertia of the front objective lens 24.

Referring especially to FIG. 2 and FIGS. 4–6, the first preferred embodiment 1.20 of the present invention can now be described. Identifying reference designators for all embodiments are marked similarly except for the prefix on reference designators, with the corresponding elements of the first embodiment 1.20 being identified using the prefix "1.". It shall be understood that many aspects of all embodiments are substantially the same, and only the differences will be treated in detail, it being understood that similar structural features of the various embodiments perform similar functions. Common elements, hereinbefore described for all embodiments, are given without a reference designator prefix.

Figure 2:
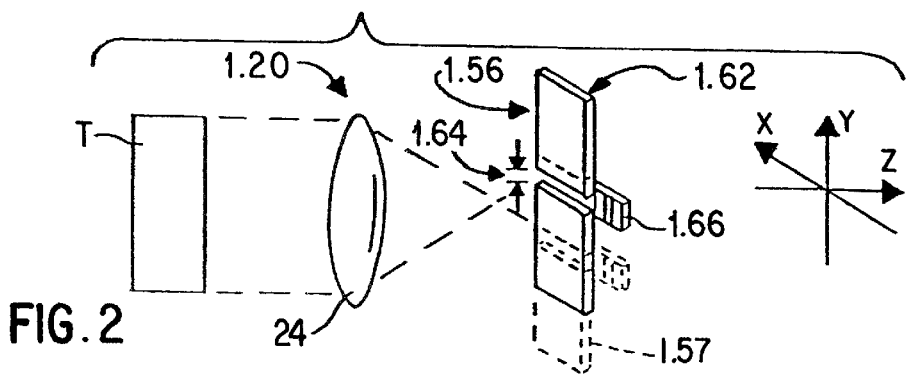
FIG. 2 is a diagram explaining the structure and operation of a first embodiment of the present invention.

The theory of the first preferred embodiment 1.20 is best understood by reference to FIG. 2. The image of the target T passes through first optical objective lens 24 and is focused onto spatial windowing means 1.62, mounted within the focal plane of first objective lens 24 and upon the rear portion of the translation stage hereinbefore described, for selectively passing a subset of row portions of the plurality of row portions of the image of target T formed within the focal plane. In the specific case of the first embodiment, the spatial windowing means 1.62 is a slit 1.64 that passes only a single row portion of the image of target T through the focal plane of first objective lens 24, and the passed subset of row portions thus contains only a single row portion of the image. Mounted in fixed relation with windowing means 1.62 and parallel to slit 1.64 is a well-known one-dimensional charge coupled device ("CCD") array 1.66 onto which the passed single row portion of the image is received, converted into an electronic charge representation of the image as received onto each of the cells of the CCD array, and then converted into an electrical signal representation of the image and passed to frame grabber means 32 via electrical video cable 30 (see FIG. 1) as hereinbefore described. Slit 1.64 preferably has a length of 16 mm and a height of 0.007 mm, and is aligned within the focal plane of the first objective lens 24 substantially parallel to the rows of the image of target T. As the slit 1.64 and CCD array 1.66 reciprocate together substantially perpendicular to the row portions of the image of target T and move relative to the first objective lens 24 from a position such as position 1.56 to a position such as position 1.57, slit 1.56 sweeps through the focal plane of the image of target T and successively selects sequential rows of the image for passage therethrough to CCD array 1.66, as illustrated in FIG. 6.

One-dimensional CCD array 1.66 is preferably a model IL-C5 CCD array having 2048 horizontal elements and made by Dalsa, Inc., having an address of 605 McMurray Road, Waterloo, Ontario, Canada N2V239. CCD array 1.66 preferably has a large number of linear CCD elements in the array because the number of those elements determines the horizontal resolution into which a particular image may be subdivided.

Figure 4:
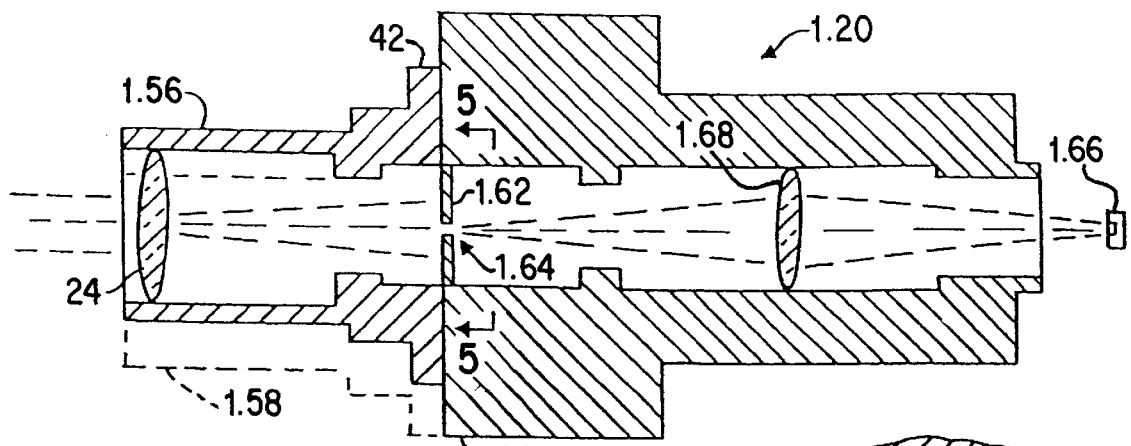
FIG. 4 is a side sectional view showing the structure of the first embodiment of the present invention and taken substantially along the midsection of the first embodiment.
Figure 5:
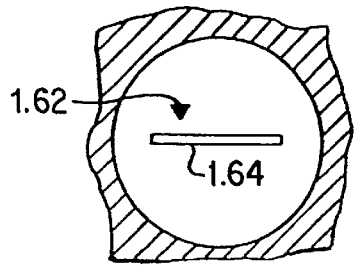
FIG. 5 is a transverse sectional view of the first embodiment of the present invention showing the slit within the focal plane of the image, taken substantially along the line 5—5 shown in FIG. 4.
Figure 6:
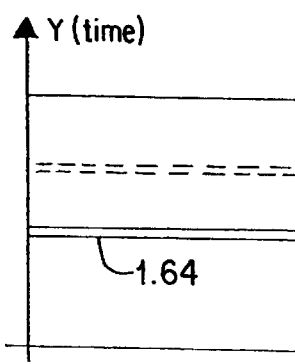
FIG. 6 is a graph showing the relative movement of the slit of the first embodiment within the focal plane of the front lens.

Referring now to FIGS. 4–6, the structure of the first embodiment 1.20 can now be explained in further detail.

Front objective lens 24 reciprocates, as from position 1.56 to position 1.58, relatively with respect to slit 1.64 and CCD array 1.66 as the servo motor, under control of the computer and its position control means, moves the front portion 42 of the translation stage with respect to the rear portion 44 of the translation stage. Interposed between slit 1.64 and CCD array 1.66 is optical image relay means 1.68 for relaying the passed single row portion of the image to the CCD array 1.66.

Image relay lens assemblies such as optical image relay means 1.68 are well-known to those skilled in the art, and take an image from one optical system and make that image available to another optical system, thereby transferring an image from one focal plane to another. In the first embodiment of the present invention, the image relay lens 1.68 is used to optically mate the image-receiving surface of the one-dimensional CCD array 1.66 with the focal plane of the front objective lens means 24. A preferred image relay lens for use as optical image relay means 1.68 of the first embodiment of the present invention is the model Apo-Artar 4.0/75 mm image relay lens, part number 35-039154, made by Schneider Optics, Inc., having an address of 285 Oser, Avenue, Hauppauge, N.Y. 11788. A well-known optical fiber bundle ("fiber optics") could also and equivalently be used for the image relay means 1.68 to transfer the image from the focal plane of the first objective lens 24 to the CCD array 1.66, and it is important to understand that the crucial function performed by image relay means 1.68 is to optically mate the focal plane of the first objective lens 24 to the CCD array 166. A disadvantage of using optical fiber bundles for image relay means 1.68 is the transmission loss present with currently available optical fiber bundles, but those transmission losses are seen to be decreasing as improvements are made in fiber optic technology.

As the slit 1.64, image relay lens 1.68, and CCD array 1.66 move relative to the front objective lens 24, a monochromatic version of the image is thus scanned by the CCD array and captured by the frame grabber means in electrical communication therewith within the computer.

Figure 3:
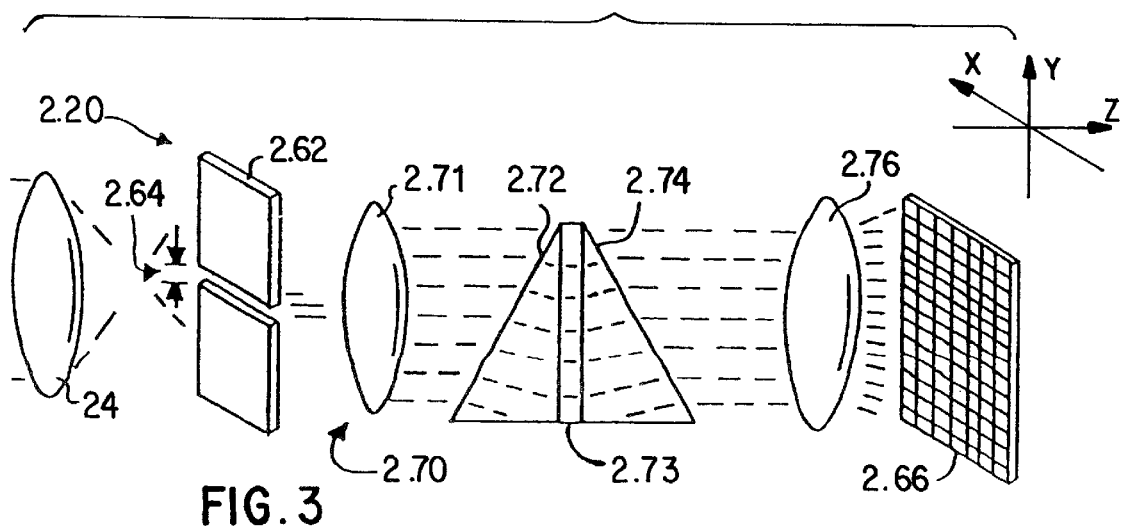
FIG. 3 is a diagram explaining the structure and operation of a second embodiment of the present invention.
Figure 7:
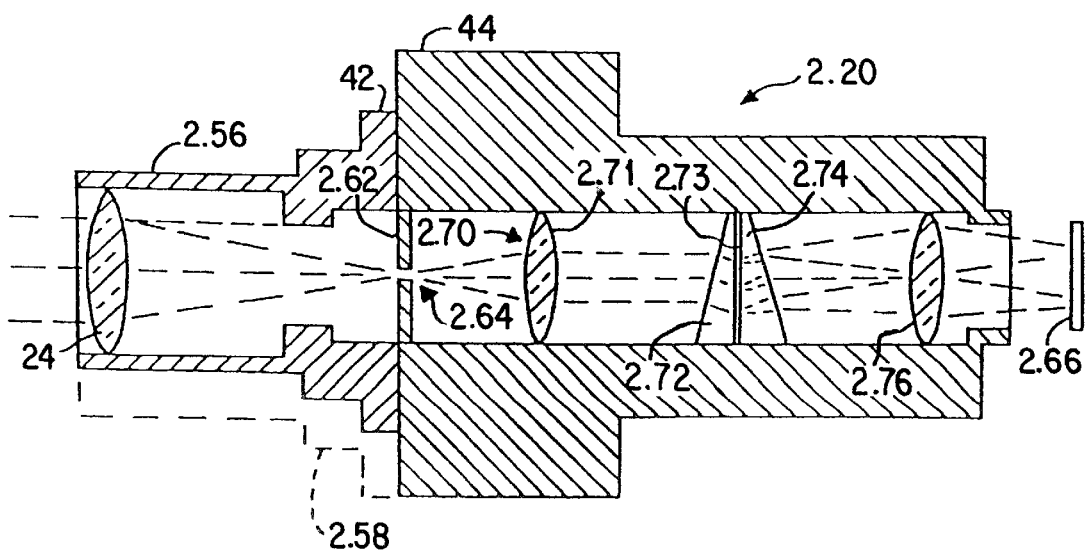
FIG. 7 is a side sectional view showing the structure of the second embodiment of the present invention and taken substantially along the midsection of the second embodiment.
Figure 15:
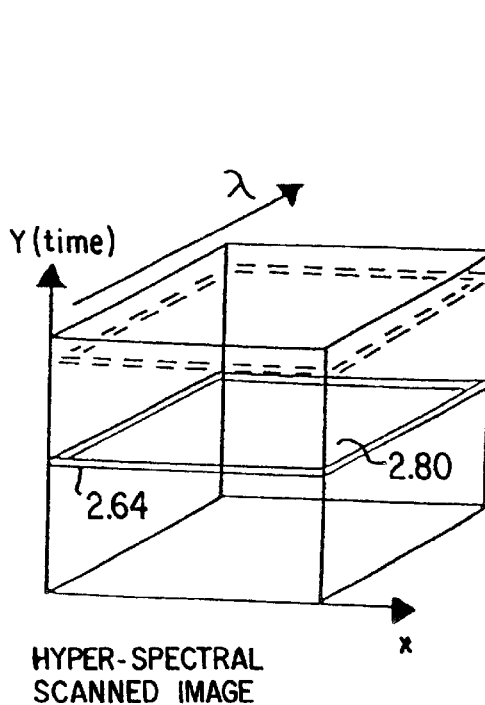
FIG. 15 is a three-dimensional graph showing the hyperspectral scanned image as a function of time by the second embodiment of the present invention.

Referring especially to FIGS. 3, 7 and 15, the second preferred embodiment 2.20 of the present invention can now be described. Identifying reference designators for all embodiments are marked similarly except for the prefix on reference designators, with the corresponding elements of the second embodiment being identified using the prefix "2.". It shall be understood that many aspects of all embodiments are substantially the same, and only the differences will be treated in detail, it being understood that similar structural features of the various embodiments perform similar functions. Common elements, hereinbefore described for all embodiments, are given without a reference designator prefix.

The theory and structure of the second preferred embodiment 2.20 is best understood by reference to FIGS. 3 and 7. The image of the target passes through first optical objective lens 24 and is focused onto spatial windowing means 2.62, mounted within the focal plane of first objective lens 24 and upon the rear portion of the translation stage hereinbefore described, for selectively passing a subset of row portions of the plurality of row portions of the image of the target formed within the focal plane. In the specific case of the second embodiment, the spatial windowing means 2.62 is a slit 2.64, substantially similar to slit 1.64 of the first embodiment, that passes only a single row portion of the image of the target through the focal plane of first objective lens 24, and the passed subset of row portions thus contains only a single row portion of the image, as was the case with the first embodiment. Mounted in fixed relation with windowing means 2.62 and parallel to slit 2.64 is a well-known two-dimensional charge coupled device ("CCD") array 2.66 onto which the passed single row portion of the image is received, converted into an electronic charge representation of the image as received onto each of the cells of the CCD array, and then converted into an electrical signal representation of the image and passed to frame grabber means 32 via electrical video cable 30 (see FIG. 1) as hereinbefore described. Slit 2.64 preferably has a length of 11 mm and a height of 0.025 mm, and is aligned within the focal plane of the first objective leans 24 substantially parallel to the rows of the image of the target as the slit 2.64 and CCD array 2.66 reciprocate together substantially perpendicular to the row portions of the image of the target and move relative to the first objective lens 24, slit 2.56 sweeps through the focal plane of the image of the target and successively selects sequential rows of the image for passage therethrough to CCD array 2.66, as illustrated in FIG. 15.

Front objective lens 24 reciprocates, as from position 2.56 to position 2.58, relatively with respect to slit 2.64 and CCD array 2.66 as the servo motor, under control of the computer and its position control means, moves the front portion 42 of the translation stage with respect to the rear portion 44 of the translation stage. Interposed between slit 2.64 and CCD array 2.66 is spectrum separation means 2.70 for spreadedly separating the single row of the image passed through slit 2.64 into a spectrum of the image that is received onto the CCD array 2.66. Preferably, spectrum separation means 2.70 is a well-known prism-grating-prism ("PGP") optical spectrometer comprising, in sequential order as the image passes therethrough, a collimating lens 2.71, a first prism 2.72, a diffraction grating 2.73, a second prism 2.74, and a focusing lens 2.76. Diffraction grating 2.73 is preferably a well-known holographic diffraction grating. Spectrum separation means 2.70 is preferably a model V9C prism-grating-prism optical spectrometer made by Spectral Imaging, Ltd., having an address of Kaitovayla 1, P.O. Box 110 FIN-90571 OULU, Finland. The prism-grating-prism optical spectrometer 2.70, in a manner well-known to those skilled in the art, spreads the spectrum of a passed image in the vertical ("y") direction (using the orientation shown) so that the spectral lines for a given horizontal point on the row portion that passes through slit 2.66 will fall upon separate rows within the respective column for that point on the CCD array 2.66. A maximum number of hyperspectral image bands of the scanned image is decided by the number of vertical rows of the CCD array 2.66 chosen, because, as just described, for each point in the image, each image band falls onto a different row of the CCD within the vertical column for that point.

Two-dimensional CCD array 2.66 is preferably a model SensiCam VGA CCD array having 640 horizontal elements and 480 vertical elements and made by The Cooke Corporation, having an address of 600 Main St., P.O. Box 888, Tonawanda, N.Y. 14150-0888. CCD array 2.66 preferably has a large number of horizontal CCD elements in the array because the number of those elements determines the horizontal resolution into which a particular image may be subdivided. At any instant, the symbolic hyperspectral plane representing the separated spectrum for a particular passed horizontal row of the image is represented by the plane 2.80 shown in FIG. 15.

As the slit 2.64, PGP spectrum separation means 2.70, and CCD array 2.66 move relative to the front objective lens 24, a hyperspectral version of the image is thus scanned by the CCD array, as shown symbolically by the hyperspectral cube 2.82 shown in FIG. 15, and is captured by the frame grabber means that is within the computer and in electrical communication with the CCD array 2.66. It should be noted in this regard that the objective lens 24 may be any type of objective lens, depending on the particular application. For example, as described in greater detail with respect to FIGS. 17–20 hereinafter, a microscopic hyperspectral imaging scanner can be achieved by using a microscope objective lens and providing a relative reciprocating scanning in which the microscope lens is fixed relative to the specimen and the camera components are moved with respect to it.

Referring especially to FIGS. 8–11 and 16, the theory and structure of the third preferred embodiment 3.20 of the present invention can now be described. Identifying reference designators for all embodiments are marked similarly except for the prefix on reference designators, with the corresponding elements of the third embodiment 3.20 being identified using the prefix "3.". It shall be understood that many aspects of all embodiments are substantially the same, and only the differences will be treated in detail, it being understood that similar structural features of the various embodiments perform similar functions. Common elements hereinbefore described for all embodiments, are given without a reference designator prefix.

Figure 16:
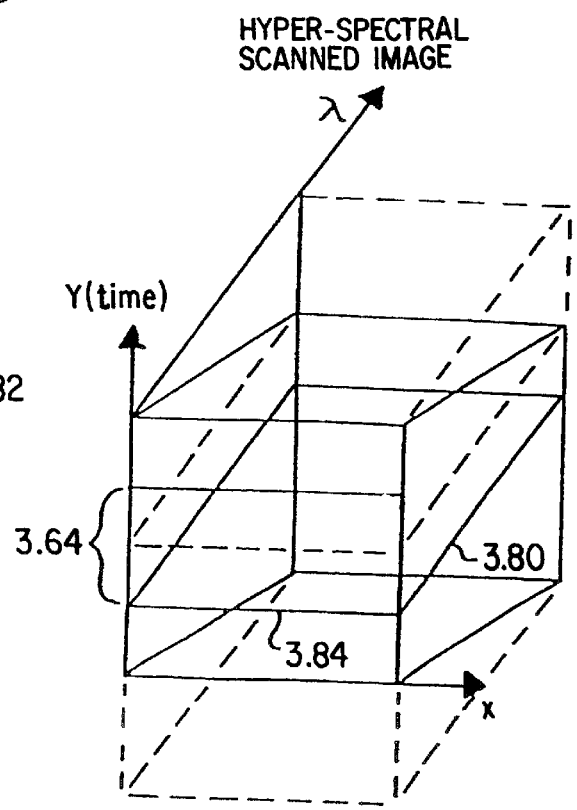
FIG. 16 is a three-dimensional graph showing the hyperspectral scanned image as a function of time by the third embodiment of the present invention.

The image of the target passes through first optical objective lens 24 and is focused onto spatial windowing means 3.62, mounted within the focal plane of first objective lens 24 and upon the rear portion of the translation stage hereinbefore described, for selectively passing a subset of row portions of the plurality of row portions of the image of the target formed within the focal plane. In the specific case of the third embodiment 3.20, the spatial windowing means 3.62 is a rectangular aperture 3.64 that passes multiple row portions of the image of the target through the focal plane of first objective lens 24. Mounted in fixed relation with windowing means 3.62 and in rectangular alignment with rectangular aperture 3.64 is a well-known two-dimensional charge coupled device ("CCD") array 3.66 onto which a bandpass-filtered version of the passed rows of the image is received, converted into an electronic charge representation of the image as received onto each of the cells of the CCD array, and then converted into an electrical signal representation of the image and passed to frame grabber means 32 via electrical video cable 30 (see FIG. 1) as hereinbefore described. As the rectangular aperture 3.64 and CCD array 3.66 reciprocate together substantially perpendicular to the row portions of the image of the target and move relative to the first objective lens 24, rectangular aperture 3.64 sweeps through the focal plane of the image of the target and successively selects multiple sequential rows of the image for passage therethrough to CCD array 3.66, as illustrated in FIG. 16.

Figure 10:
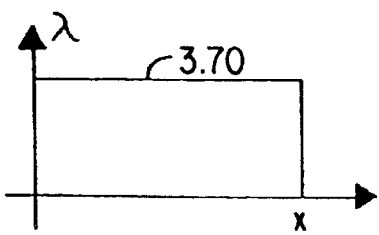
FIG. 10 is a graph explaining the structure of the linear variable filter of the third embodiment of the present invention.
Figure 9:
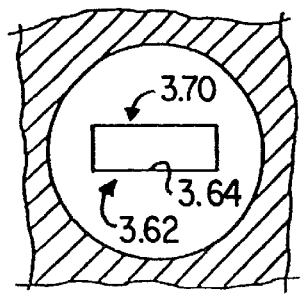
FIG. 9 is a transverse sectional view of the third embodiment of the present invention showing the linear variable filter's rectangular window within the focal plane of the image, taken substantially along the line 9—9 shown in FIG. 8.
Figure 11:
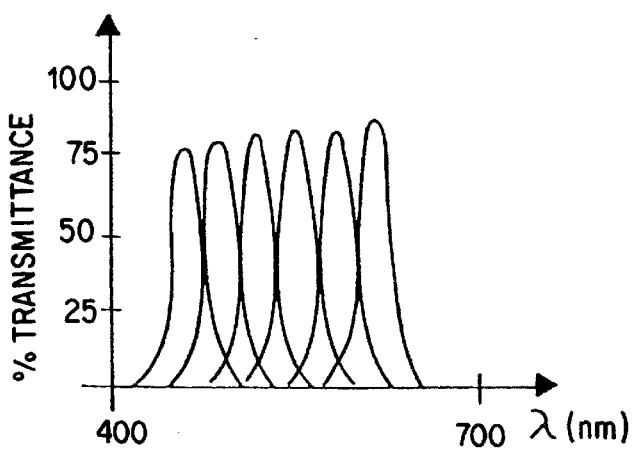
FIG. 11 is a graph explaining the spectral transmittance performance of the linear variable filter of the third embodiment of the present invention.

Preferably integral with windowing means 3.62 is spectrum filtering means 3.70, preferably a well-known linear variable filter ("LVF") such as one of those sold under the trademark SELECTRABAND and made by Optical Coating Laboratory, Inc. ("OCLI"), 2789 Northpoint Parkway, Santa Rosa, Calif. 95407-7397. Such linear variable filters are rectangular interference filters performing both a rectangular windowing function and a spectrum filtering function, and consist of all-dielectric coating materials that have been vacuum deposited onto rectangular substrates. Such filters offer continuous spectral coverage within a predetermined portion of the visible wavelength region and have a linear-variable bandpass along one dimension (the "l" dimension) and have a fixed bandpass along the other ("x") dimension. FIG. 11 shows the percentage transmittance of the filter within various wavelength bands as a function of wavelength ("l") along one axis of the filter, and, as shown in FIG. 10, the filter is oriented in the third embodiment so that the wavelength transmittance varies along the vertical direction, i.e., the same direction as the direction of reciprocation of the translation stage, so that, for example, the longer wavelengths of the image are passed by a strip along the top of the filter's rectangle and so that the shorter wavelengths of the image are passed by another strip along the bottom of the filter's rectangle. Because the dielectric coating is overlapped upon a rectangular clear aperture, the linear variable filter means 3.70 performs not only a spatial windowing operation, passing only a multiple row subset from the plurality of row portions of the image, but also performs a spectrum filtering operating upon the rectangularly-windowed multiple row portion of the image.

The design theory of the well-known linear variable filter 3.70 is based on the phenomenon that as the dielectric coating thickness varies along the length of the filter's l axis, so does the transmitted wavelength. The correlation between coating thickness is very repeatable, so wavelength calibration can be simplified. The preferred linear variable filters are physically durable and withstand the rigors of industrial and military environments. They are resistant to abrasion and humidity, and can be cleaned by conventional optical cleaning techniques. In addition, these linear variable filters are capable of being operated at temperatures as low as 4° Kelvin.

The various linear variable filters offered under the trademark SELECTRABAND by OCLI differ primarily in their spanned wavelength coverage and in their relative transmittance, with all of these filters having their dielectric coatings deposited on glass substrates. The model LVF400-700 and LVF400-700NB linear variable filters offer continuous wavelength coverage from 400 to 700 nm, have a half-bandwidth that is 2.5% or less of the center wavelength, have a linearity of +/−2 nm, have an out-of-bandwidth blocking specification of 0.1% or less from 400 to 700 nm and less than 0.1% below 400 nm, and have an aperture window that is approximately 5.0 mm by 10.0 mm. The LVF400-700 linear variable filter has transmittance of 45% or greater within the wavelengths specified and offers superior near-infrared blocking, having a near infrared blocking specification of 0.01% or less (average) from 750 to 1200 nm. The LVF400-700NB linear variable filter has spectral characteristics similar to the LVF400-700 linear variable filter except that the LVF400-700NB has 60% or greater peak transmittance and has no near-infrared blocking.

The model LVF600-1100 and LVF600-1100NB linear variable filters are similar but offer continuous wavelength coverage from 600 to 1100 nm, have a half-bandwidth that is 2.0% or less of the center wavelength, have a linearity of +/−4 nm, have an out-of-bandwidth blocking specification of 0.1% or less from 600 to 1100 nm and less than 0.1% above 1100 to 1150 nm, and have an aperture window that is approximately 5.0 mm by 12.5 mm. The LVF600-1100 linear variable filter has transmittance of 45% or greater within the wavelengths specified and offers near-ultraviolet blocking, having a near ultraviolet blocking, having a near ultraviolet blocking specification of 0.01% or less (average) from 350 to 550 nm. The LVF600-1100NB linear variable filter has spectral characteristics similar to the LVF600-1100 linear variable filter except that the LVF600-1100NB has 60% or greater peak transmittance and has no short wavelength blocking.

The model LVF650-1050 and LVF650-1050NB linear variable filters are modified versions of the model LVF600-1100 and LVF600-1100NB linear variable filters except that the LVF650-1050 and LVF650-1050NB linear variable filters offer continuous wavelength coverage from 650 to 1050 nm.

The appropriate linear variable filter should be selected depending on the spectral information desired from the scanned image. While the third embodiment of the present invention, using a linear variable filter, does not have a spectral resolution as great as that of the second embodiment of the present invention using the prism-grating-prism ("PGP") optical spectrometer, the third embodiment with the linear variable filter has been found to have higher transmittance, thereby enabling images to be scanned in lower light level situations on relatively darker images.

Front objective lens 24 reciprocates, as from position 3.56 to position 3.58, relatively with respect to rectangular window 3.64 and CCD array 3.66 as the servo motor, under control of the computer and its position control means, moves the front portion 42 of the translation stage with respect to the rear portion 44 of the translation stage. Interposed between rectangular window 3.64 and CCD array 3.66 is optical image relay means 3.68 for relaying the passed bandpass-filtered multiple rows of the windowed portion of the image to the CCD array 3.66.

Optical image relay lens 3.68 of the third embodiment serves a similar function as the image relay lens 1.68 of the first embodiment 1.20 hereinbefore described. In the third embodiment 3.20 of the present invention, the image relay lens 3.68 is used to optically mate the image-receiving surface of the two-dimensional CCD array 3.66 with the focal plane of the front objective lens means 24, transferring the windowed image passed by the linear variable filter 3.70 to the two-dimensional CCD array 3.66. A preferred image relay lens for use as optical image relay means 3.68 of the third embodiment 3.20 of the present invention is the model Apo-Artar 4.0/75 mm large relay lens, part number 35-039154, made by Schneider Optics, Inc., having an address of 285 Oser Avenue, Hauppauge, N.Y. 11788. A wellknown optical fiber bundle ("fiber optics") could also and equivalently be used for the image relay means 3.68 to transfer the image from the focal plane of the first objective lens 24 to the two-dimensional CCD array 3.66, and it is important to understand that the critical function performed by image relay means 3.68 is to optically mate the focal plane of the first objective lens 24 to the plane of the two-dimensional CCD array 3.66. A disadvantage of using optical fiber bundles for image relay means 3.68 is the transmission loss present with currently-available optical fiber bundles, but those transmission losses are seen to be decreasing as improvements are made in fiber optic technology. However, a significant advantage of using optical fiber bundles for image relay means 3.68 is that, by spreading the optical fibers in the bundle as the fibers approach two-dimensional CCD array 3.66, the transmitted image can thus be "stretched" in one or both spatial dimensions of the CCD array 3.66 so as to match the LVF to the resolution of two-dimensional CCD array 3.66. For example, a CCD array having twice the number of rows could be used to give twice the frequency resolution in the "y" direction as compared to a smaller CCD array, but the height of the CCD array might not match the height of the LVF. By stretching the image in the vertical ("y") direction by spreading the optical fibers as they matingly approach the CCD array, the image passed by the LVF would be spread onto the available rows of the two-dimensional CCD array. Likewise, if greater horizontal resolution is desired, the optical fibers would be spread in the horizontal ("x") direction onto a wider CCD array having columns into which the image would be partitioned horizontally. Thus, the aspect ratio of the image can be changed to mate the LVF's dimensions with the CCD's dimensions, as required.

Two-dimensional CCD array 3.66 is preferably a model SensiCam VGA CCD array having 640 horizontal elements and 480 vertical elements and made by The Cooke Corporation, having an address of 600 main St., P.O. Box 888, Tonawanda, N.Y. 14150-0888. CCD array 3.66 preferably has a large number of horizontal CCD elements in the array because the number of those elements determines the horizontal resolution into which a particular image may be subdivided. The symbolic hyperspectral plane representing the separated spectrum for a particular passed horizontal row 3.84 of the image is represented by the plane 3.80 within the hyperspectral cubic diamond shown in FIG. 16. A maximum number of hyperspectral image bands of the scanned image is decided by the number of vertical rows of the CCD array 3.66 chosen, because, as just described, for each windowed portion of the image, successive spectral image bands for successive windowed rows of the image fall onto a different successive rows of the CCD.

As the rectangular window 3.64 and linear variable filter 3.70, image relay lens 3.68, and CCD array 3.66 move relative to the front objective lens 24, a hyperspectral version of the image is thus scanned by the CCD array, as shown symbolically by the hyperspectral cubic diamond shown in FIG. 16, and is captured by the frame grabber means that is within the computer and in electrical communication with the CCD array 3.66. Because the LVF has its linear-variable bandpass function varying along the height ("l" dimension) of its rectangular aperture 3.62, it is necessary for the reciprocation of the translation stage mounting means to overtravel the image by a distance equal to the height of the LVF so that the LVF fully sweeps past the entire image. This overtravel results in excess image data at the beginning and end of the translation stage's reciprocation because, at the extremes of the reciprocation, a portion of the LVF is outside the top and bottom boundaries of the image of the target. For example, when the top of the LVF is aligned with the bottom of the image in the focal plane, the lower portions of the LVF are outside (below) the image of the target in the focal plane. Likewise, because successive varying wavelength filtering for a given row of the image occurs as the LVF sweeps by that given row of the image as time passes, the various spectral band portions of a given row are received by the CCD array 3.66 as time passes, rather than all spectral band portions being received at the same instant by the CCD 2.66 of the second embodiment. For this reason, the hyperspectral plane 3.8 in FIG. 16 is shown at an angle because of the time sequence involved in its reception by the CCD.

Figure 8:
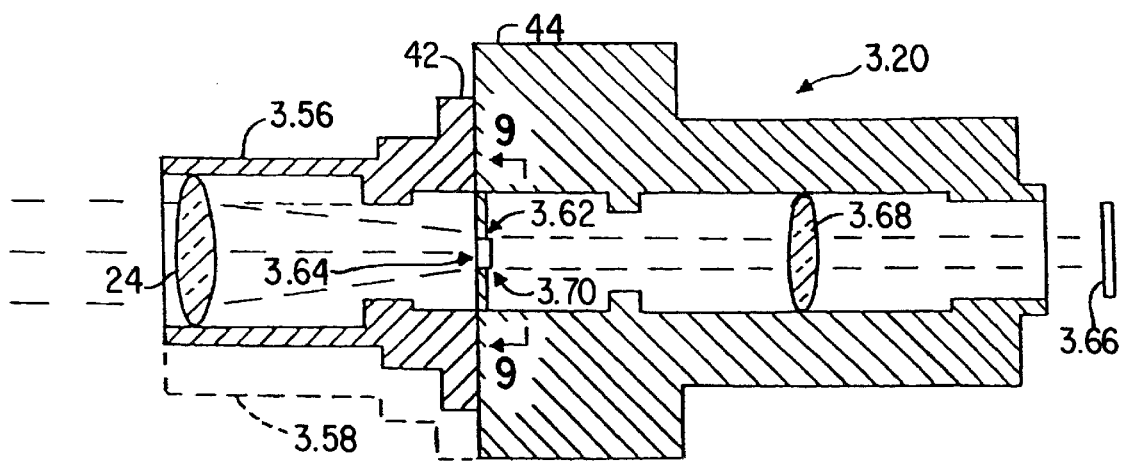
FIG. 8 is a side sectional view showing the structure of the third embodiment of the present invention and taken substantially along the midsection of the third embodiment.

In each of the preceding embodiments, the front objective lens 24 is assumed to be a moving item, as shown in FIGS. 4, 7 and 8. However, as noted previously, this is just one way of performing the relative reciprocating scan at the image focal plane. Another way of performing such scan is to fix the front objective lens 24 and its associated mounting component 42 (FIGS. 4, 7 and 8), and to relatively move in a similar reciprocating manner the behind imaging components such as items 1.62, 1.64, 1.68, 1.66 and 1.20 in FIG. 4; items 2.62, 2.64, 2.70, 2.71, 2.72, 2.73, 2.74, 2.76, 2.66 and 2.20 in FIG. 7; items 3.62, 3.70, 3.68, 3.66 and 3.20 in FIG. 8.

Figure 17:
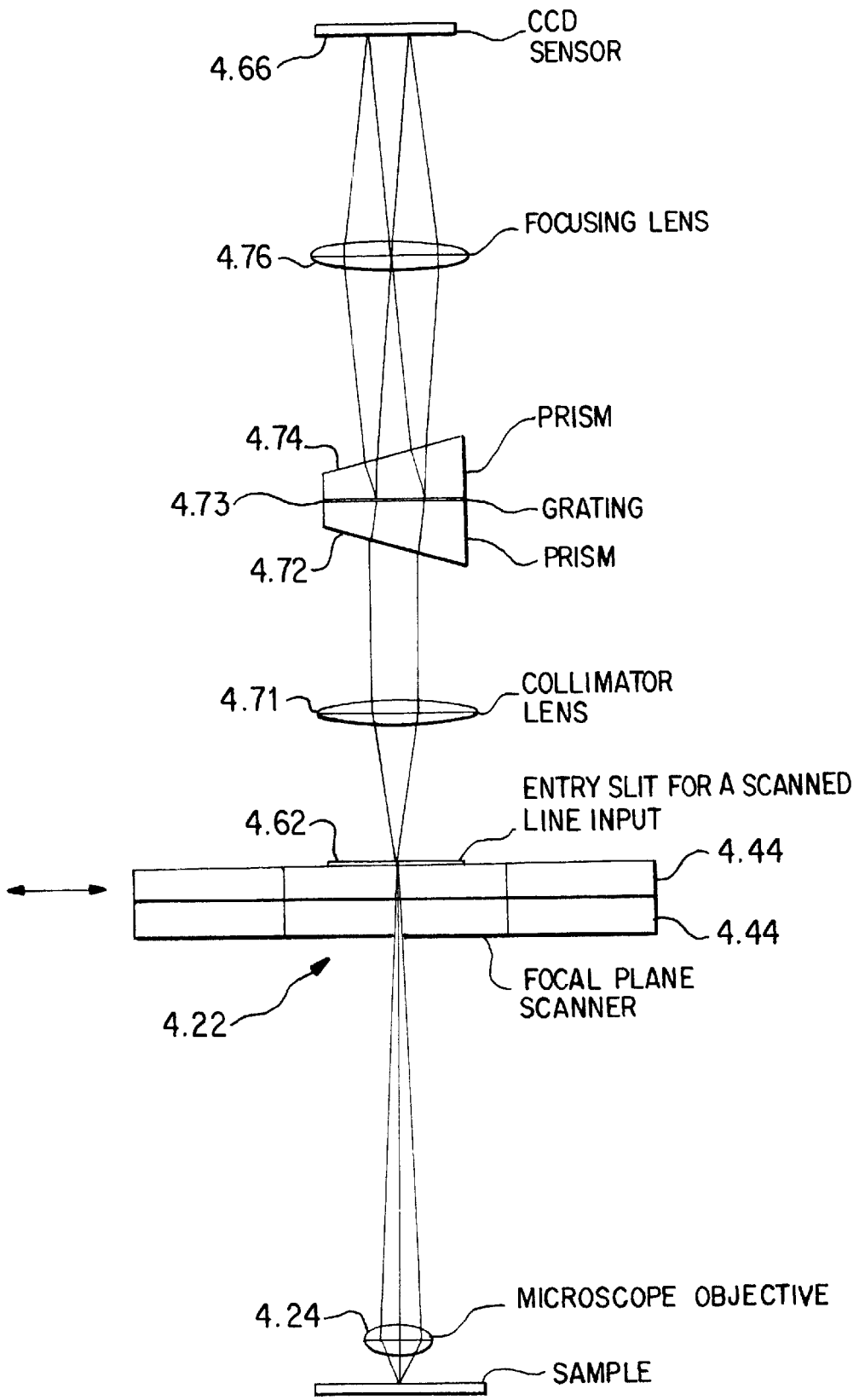
FIG. 17 is a schematic view of a microscopic hyperspectral scanner according to the fourth embodiment of the invention.

FIG. 17 is a schematic depiction of a hyperspectral scanning microscope according to a fourth embodiment of the invention, in which the collimating lens 4.71, first prism 4.72, diffraction grating 4.73, second prism 4.74 and focusing lens 4.76 of the PGP optical spectrometer, as well as the sensor array 4.66 are comparable to the corresponding elements in the first, second and third embodiments of the invention, described previously. In this embodiment, however, the lens 4.24 is a microscopic objective lens which provides the capability of enlarging the image of the target specimen, so that a microscopic hyperspectral analysis can be performed.

As in the other embodiments, in the fourth embodiment, with a front microscope lens, an image of the target specimen is projected onto the window element 4.62, which passes an elongated row portion of the image through a slit (not shown). In a manner known to those skilled in the art, the windowed image portion is transmitted via the PGP optical spectrometer, comprising the collimating lens 4.71, prisms and diffraction grating 4.72–4.74 and the focusing lens 4.76, and is focused on the CCD sensor array 4.66. The PGP optical spectrometer spreads the spectrum of the passed image in the direction perpendicular to the slit so that the spectral content of points along the transmitted row portion are spread downward along respective columns of the CCD array 4.66, thereby providing signals for generating a hyperspectral image in electronic form.

As shown in FIG. 17, the windowing element 4.62 is mounted on the rear portion 4.44 of a translation stage 4.22 which is the same as the mounting means 22 described previously and depicted in particular in FIGS. 1, 12 and 13. The microscopic objective lens element 4.24 is mounted on the front portion 4.42 of the translation stage 4.22 so that it is fixed in the frame of the microscope while all the other components will be driven by the stage's servo motor sub-system (FIGS. 12 and 13, items 22, 38, 40, 48, 50, 52, 54) to perform a relative reciprocating image scan.

Figure 18:
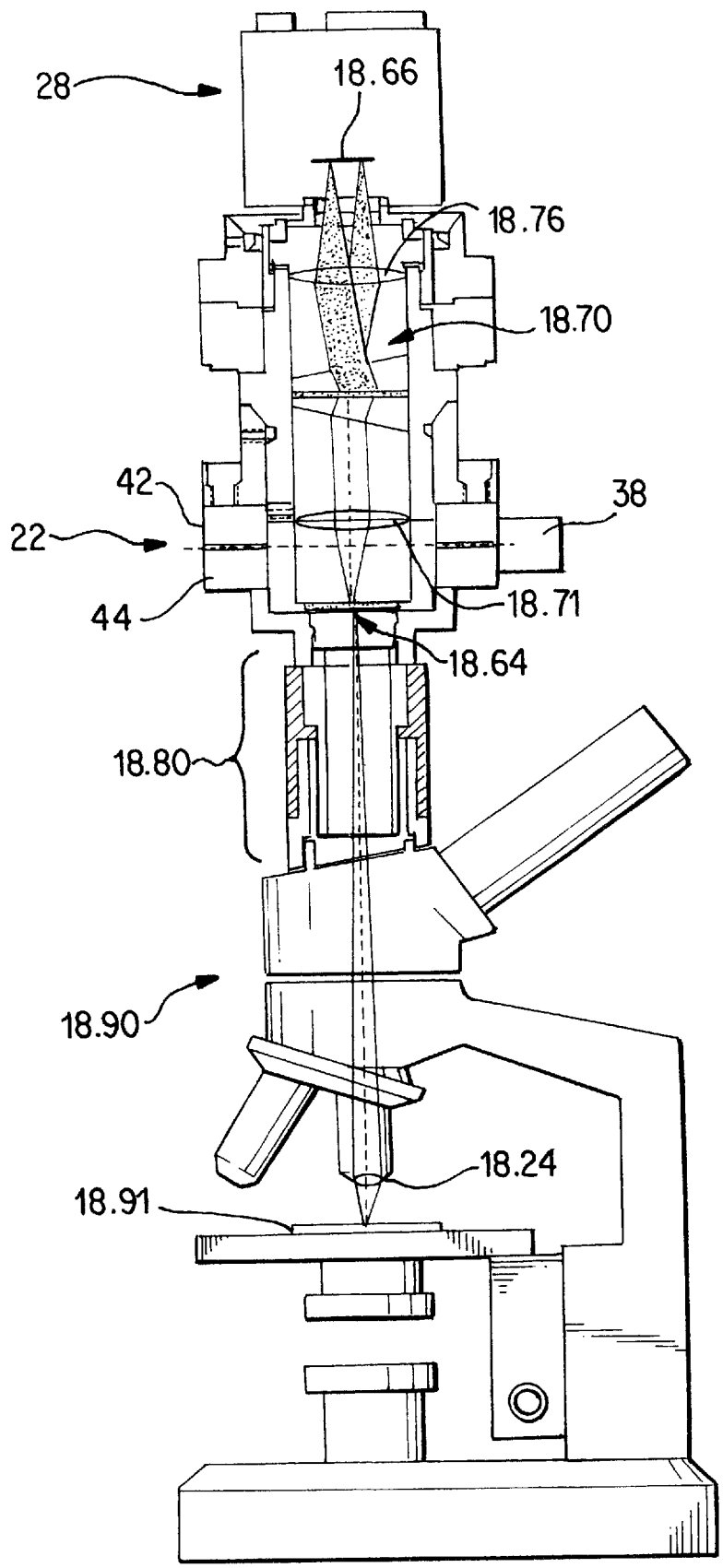
FIG. 18 shows exemplary constructional details of the embodiment of the microscopic hyperspectral scanner of FIG. 17.

FIG. 18 shows an example of the constructional details of an embodiment of a microscopic hyperspectral scanner such as is depicted schematically in FIG. 17. In this embodiment, the components of the reciprocating scanner body itself, including the window and slit, translation stage, servo motor, prisms and CCD array correspond to those in the previous embodiments; they are thus numbered accordingly, and require no further description here.

As can be seen in FIG. 18, in the microscopic embodiment of the invention, the CCD camera, including the components mentioned above, is mounted on a microscope 18.90 of conventional design, by means of a microscope adapter assembly 18.80, which is coupled to the microscope in a known manner. Accordingly, as noted previously, the front objective lens 18.24 and the microscope 18.90 remain stationary relative to the specimen 18.91, while the slit 18.64, optical elements and CCD array 18.66 of the CCD camera are translated (horizontally in the Figure) by the translation stage 22 in order to generate the necessary focal plane scanning movement.

The microscope adapter assembly 18.80, which is used to connect the hyperspectral imaging focal plane scanner and the microscope is shown in greater detail in FIGS. 19 and 20. It consists of three components: a C-mount adapter 18.81, a focusing adjustment ring 18.82 and a microscope adapter 18.83.

The C-mount adapter has threads 18.81a, 18.81b at top and bottom. The top thread 18.81a can be threaded into the above C-mount of the hyperspectral focal plane scanner, while the bottom thread 18.81b can be threaded into the focusing adjustment ring 18.82. By turning the focusing adjustment ring, the entry slit 18.64 of the hyperspectral imaging focal plane scanner can be precisely located within the focal plane of the microscope lens.

The focusing adjustment ring 18.82 sits freely on the microscope adapter and uses its middle neck thread 18.82b to raise and lower the C-mount adapter, which holds the hyperspectral focal plane scanner, as noted above. The focusing adjustment ring has two locking screws 18.82a for locking it to both the above C-mount adapter and the microscope adapter 18.83.

The microscope adapter 18.83 simply provides a firm connection between the microscope frame and the hyperspectral imaging focal plane scanner by means of the focusing adjustment ring 18.82 and the C-mount adapter 18.81. It has a locking screw 18.83a for mounting securely onto a conventional coupling on the microscope frame, as noted previously.

To use all embodiments of the present invention, as shown in FIG. 1, a target T is placed in the viewing range of front objective lens 24. As the servo motor 38, under control of position control means 36, causes the translation stage to reciprocate, in a manner hereinbefore described, the electrical signal representing the scanned image passes along cable 30 to frame grabber means 32, where the image is captured and stored for further viewing and/or processing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A microscopic imager, comprising:
   an optical sensor array having at least one row of optical sensor elements;
   a window element with an elongate aperture therein, said aperture being spatially aligned with and fixed relative to said at least one row of sensor elements;
   a microscopic lens element which focuses an image of a target specimen onto said window element;
   said microscopic lens element, said aperture and said sensor defining an optical path by which said aperture passes an elongate image subset comprising a portion of said image onto said sensor and blocks portions of said image not included in said subset; and
   a drive unit for tandem translational movement of said window element and said optical sensor array relative to said microscopic lens element, in a direction substantially transverse to said optical path and substantially perpendicular to a longitudinal axis of said aperture.

2. The microscopic imager according to claim 1, wherein said sensor array comprises a one dimensional array with a single row of optical sensor elements, and said aperture passes an image subset that corresponds to said single row of optical sensors.

3. The microscopic imager according to claim 1, wherein said optical sensor array comprises a two dimensional array having a plurality of rows of optical sensor elements, said microscopic imager further comprising a spectral separating element interposed in said optical path between said window element and said optical sensor array, for spreading said elongate image subset onto said two dimensional array.

4. The microscopic imager according to claim 3, wherein said aperture passes an image subset that corresponds to a single row of sensor elements in said two dimensional array.

5. The microscopic imager according to claim 3, wherein said aperture passes an image subset that corresponds to a plurality of rows of sensor elements in said two dimensional array.

6. The microscopic imager according to claim 1, wherein said microscopic lens element is contained in a separable microscope, and said optical sensor array and said window element are contained in a separate camera component which is coupled to said microscope via said drive unit.

7. The microscopic imager according to claim 6, wherein:
said drive unit comprises front and rear portions which are translationally reciprocatable relative to each other in said direction substantially transverse to said optical path and substantially perpendicular to a longitudinal axis of said aperture;
said microscope is detachably mounted in fixed position on and relative to said front portion of said drive unit; and
said camera component is detachably mounted in fixed position on and relative to said rear portion of said drive unit.

8. A microscopic imager, comprising:
a window element having an elongate aperture therein;
a microscopic lens element which focuses an image of a target specimen onto said window element, said image including a plurality of elongate image row portions corresponding to said elongate aperture;
an optical sensor array mounted in fixed spatial relationship relative to said window element, and comprising at least one row of sensor elements corresponding to and aligned with a row portion of said image;
said microscopic lens element, said aperture and said sensor array defining an optical path for transmitting a subset of said row portions of said image from said aperture onto said optical sensor array and blocking row portions not included said subset; and
a drive unit for tandem translational movement of said window element and said optical sensor array relative to said microscopic lens element in a direction substantially transverse to said optical path and substantially perpendicular to a longitudinal axis of said aperture.

9. The microscopic imager according to claim 8, wherein said sensor array comprises a one dimensional array having a single row of optical sensor elements, and said aperture passes a single row portion of said image to said single row of optical sensor elements.

10. The microscopic imager according to claim 8, wherein said optical sensor array comprises a two dimensional array having a plurality of rows of optical sensor elements, said microscopic imager further comprising a spectral separating element interposed in said optical path between said window element and said optical sensor array, for spreading said elongate image subset onto said two dimensional array.

11. The microscopic imager according to claim 10, wherein said aperture passes an image subset that corresponds to a single row of sensor elements in said two dimensional array.

12. The microscopic imager according to claim 10, wherein said aperture passes an image subset that corresponds to a plurality of rows of sensor elements in said two dimensional array.

13. The microscopic imager according to claim 8, wherein said microscopic lens element is contained in a separable microscope, and said optical sensor array and said window element are contained in a separate camera component which is coupled to said microscope via said drive unit.

14. The microscopic imager according to claim 13, wherein:
said drive unit comprises front and rear portions which are translationally reciprocatable relative to each other in said direction substantially transverse to said optical path and substantially perpendicular to a longitudinal axis of said aperture;
said microscope is detachably mounted in fixed position on and relative to said front portion of said drive unit; and
said camera component is detachably mounted in fixed position on and relative to said rear portion of said drive unit.

15. A microscopic imager comprising:
a microscopic lens element which focuses an image of a target specimen in a focal plane, said image comprising a plurality of elongate image row portions;
an optical sensor array comprising at least one row of sensor elements aligned with said image row portions;
a window element disposed in said focal plane in fixed spatial relationship to said sensor array, and having an elongate aperture for passing a subset of said image row portions to said sensor array and blocking image row portions not included in said subset; and
a drive device for tandem translational movement of said window element and said sensor array relative to microscopic lens element, within said focal plane, in a direction substantially perpendicular to a longitudinal axis of said aperture.

16. The microscopic imager according to claim 15, wherein said sensor array comprises a one dimensional array with a single row of optical sensor elements, and said aperture passes an image subset that corresponds to said single row of optical sensor elements.

17. The microscopic imager according to claim 15, wherein said optical sensor array comprises a two dimensional array having a plurality of rows of optical sensor elements, said microscopic images further comprising a spectral separating element interposed between said window element and said optical sensor array, for spreading said elongate subset portion of said image onto said two dimensional array.

18. The microscopic imager according to claim 17, wherein said aperture passes an image subset that corresponds to a single row of sensor elements in said two dimensional array.

19. The microscopic imager according to claim 17, wherein said aperture passes an image subset that corresponds to a plurality of rows of sensor elements in said two dimensional array.

20. The microscopic imager according to claim 15, wherein said microscopic lens element is contained in a separable microscope, and said optical sensor array and said window element are contained in a separable camera component which is coupled to said microscope via said drive unit.

21. The microscopic imager according to claim 20, wherein:
said drive device comprises front and rear portions which are translationally reciprocatable relative to each other in said direction substantially perpendicular to said longitudinal axis of said aperture;
said microscope is detachably mounted in fixed position on and relative to said front portion of said drive device; and
said camera component is detachably mounted in fixed position on and relative to said rear portion of said drive device.

22. A hyperspectral microscope, comprising:
a table for supporting a specimen to be imaged by said microscope;

a microscopic objective lens element disposed adjacent said table;

a window element having an elongate aperture for passing a row portion of an image projected on said window element by said microscopic objective lens element, and blocking portions of said image which are not in said row portion;

a two dimensional optical sensor array having a plurality of rows of optical sensor elements;

a spectral separation component interposed in an optical path between said window element and said sensor array, for spreading said passed row portion of said image into spectral components and directing said spectral components onto said two dimensional sensor array; and a drive unit for translational movement of said window element in a direction substantially perpendicular to said optical path and to a longitudinal axis of said aperture.

23. The hyperspectral microscope according to claim 22, wherein:

said microscopic objective lens element is contained in a separable microscope, and said optical sensor array, said spectral separation component and said window element are contained in a separable camera component which is coupled to said microscope via said drive unit.

24. The hyperspectral microscope according to claim 23, wherein:

said drive unit comprises front and rear portions which are translationally reciprocatable relative to each other in said direction substantially perpendicular to said optical path and to said longitudinal axis of said aperture; and said microscope is detachably mounted in fixed position on and relative to said front portion of said drive unit; and said camera component is detachably mounted in fixed position on and relative to said rear portion.

25. A camera assembly for scanning a microscopic optical image formed by a microscope, comprising:

an optical sensor array having at least one row of optical sensor elements; a window element with an elongate aperture therein, said aperture being spatially aligned with and fixed relative to said at least one row of sensor elements;

an image relay device for transferring light transmitted through said aperture and projecting it onto said optical sensor array;

an adapter for mounting said camera assembly to a body of a microscope such that an objective lens of said microscope focuses an image on said window element, and such that an optical path is formed between said objective lens and said sensor array;

a drive unit for tandem translational movement of said optical sensor, said window element and said image relay device relative to said adapter, in a direction substantially transverse to said optical path and substantially perpendicular to a longitudinal axis of said aperture.

26. The camera assembly according to claim 25, wherein:

said drive unit comprises front and rear portions which are translationally reciprocatable relative to each other in said direction substantially transverse to said optical path and substantially perpendicular to a longitudinal axis of said aperture;

said microscope is fixedly mounted to said front portion of said drive unit; and said optical sensor, said window element and said image relay element are fixedly mounted to said rear portion of said drive unit.

27. The camera assembly according to claim 25, wherein said sensor array comprises a one dimensional array with a single row of optical sensor elements, and said aperture passes an image subset that corresponds to said single row of optical sensor elements.

28. The camera assembly according to claim 25, wherein said optical sensor array comprises a two dimensional array having a plurality of rows of optical sensor elements, said camera assembly further comprising a spectral separating element interposed in said optical path between said window element and said optical sensor array, for spreading said elongate image subset onto said two dimensional array.

29. The camera assembly according to claim 28, wherein said aperture passes an image subset that corresponds to a single row of sensor elements in said two dimensional array.

30. The camera assembly according to claim 28, wherein said aperture passes an image subset that corresponds to a plurality of rows of sensor elements in said two dimensional array.

* * * * *